3,199,951
METHOD OF PREPARING CYANOGEN
William L. Fierce, Walter J. Sandner, and Roger L. Weichman, all of Crystal Lake, Ill., assignors to The Pure Oil Company, Chicago, Ill., a corporation of Ohio
No Drawing. Filed Dec. 4, 1961, Ser. No. 156,920
8 Claims. (Cl. 23—151)

This invention relates to new and useful improvements in processes for the preparation of cyanogen chloride and/or cyanogen. In particular, this invention is concerned with a process for the catalyzed oxidation of hydrogen cyanide with nitrosyl chloride, at temperatures in the range from about 200° to 1000° C., to yield cyanogen chloride and/or cyanogen.

In Fierce and Sandner U.S. Patent 2,884,308, there is described a process for the preparation of cyanogen by the catalyzed reaction of hydrogen cyanide with a nitrogen oxide (e.g., $NO_2$, $N_2O_3$, etc.) having an oxidation state higher than nitric oxide. The reaction can also be carried out using mixtures of nitric oxide or higher nitrogen oxides, and oxygen. However, nitric oxide alone is completely ineffective for oxidizing hydrogen cyanide in the presence or absence of a catalyst. In co-pending applications, Fierce et al., Serial No. 852,444, filed November 12, 1959, now Patent No. 3,020,126; Folkins et al., Serial No. 76,495, filed December 19, 1960, and now abandoned; Geerts et al., Serial No. 79,536, filed December 30, 1960, now Patent No. 3,065,056; Geerts et al., Serial No. 133,139, filed August 22, 1961, and now abandoned; and Geerts et al., Serial No. 117,817, filed June 19, 1961, there are described modifications of the process of Patent 2,884,308, and improvements in methods of preparing catalysts which are useful in that process.

Perrot, Compt. rend., 206, 1575 (1938); Chem. Absts., 32, 6240 (1938), has investigated the reactions of nitrosyl chloride (NOCl) with hydrogen cyanide and with cyanogen. Perrot reports that nitrosyl chloride reacts with hydrogen cyanide at 200° C. to give cyanogen chloride, nitric oxide, and hydrogen chloride. Under the same conditions, cyanogen reacts with nitrosyl chloride to yield cyanogen chloride and carbon dioxide.

One of the objects of this invention is to provide a new and improved process for the preparation of cyanogen chloride and/or cyanogen.

Another object of this invention is to provide a catalytic method for preparation of mixtures of cyanogen and cyanogen chloride from hydrogen cyanide.

A feature of this invention is the provision of an improved catalytic process wherein hydrogen cyanide is reacted with nitrosyl chloride to yield a mixture of cyanogen chloride and cyanogen.

A further feature of this invention is the provision of an improved process in which nitrosyl chloride and hydrogen cyanide are reacted at temperatures in the range from about 200° to 1000° C., in the presence of an oxidation catalyst, such as an oxide or strong acid salt of metals of Groups I and IIA of the Periodic Table, to yield cyanogen chloride at lower temperatures, mixtures of cyanogen chloride and cyanogen at moderate temperatures, and cyanogen alone at elevated temperatures.

Other objects and features of this invention will become apparent from time to time throughout the specification and claims as hereinafter related.

In accordance with this invention, we have discovered a catalytic procedure in which the products and yields in the hydrogen cyanide-nitrosyl chloride reaction are changed in an unexpected manner. Cyanogen and improved yields of cyanogen chloride are the products of the catalyzed reaction. In our process, hydrogen cyanide and nitrosyl chloride are contacted in the gas phase with an oxidation catalyst at temperatures in the range from about 200° to 1000° C. At temperatures from about 200° to 300° C., cyanogen chloride is obtained in small yields, although this reaction does not take place in the absence of a catalyst. In the temperature range from about 300° C. to about 500° C., there is obtained a substantial improvement in the yield of cyanogen chloride together with substantial amounts of cyanogen. At temperatures above 500° C., cyanogen chloride disappears as a product and cyanogen is the only product containing the cyanide group. In carrying out our process, any oxidation catalyst can be used which is effective in promoting the oxidation of hydrogen cyanide by nitrogen dioxide. Catalysts of this type are described in Patent 2,884,308, and in the several co-pending applications referred to above. In particular, catalysts which are effective in our process include oxides and salts of strong acids of metals of Groups I and IIA of the Periodic Table, e.g., sodium oxide, potassium oxide, lithium oxide, barium oxide, calcium oxide, magnesium oxide, strontium oxide, magnesium chloride, calcium chloride, potassium chloride, trisosdium phosphate, tripotassium phosphate, calcium nitrate, magnesium nitrate, strontium nitrate, and mixed oxides or salts, such as lime-glass beads and double salts. The catalysts are preferably supported on an inert support, such as pumice or a porous refractory oxide, and may be prepared in the manner of any of the aforementioned co-pending applications.

In carrying out our process, the pressure of reaction is not critical and may vary from rather low sub-atmospheric pressures to high super-atmospheric pressures, although the use of atmospheric pressure or of a very slight super-atmospheric pressure is preferred. The rate of flow of reactants is not critical and the gaseous hourly space velocity of reactants may vary from about 50 to 10,000 or even higher. Space velocity of reactants is defined as the ratio of the volume of reactant gases (S.T.P.) charged per hour to the volume of catalyst space of a single reactor. The ratio of reactants is not critical and may vary widely, e.g., 0.01–100 mols of HCN per mol of NOCl. It is generally preferred to use HCN/NOCl mol ratios which are greater than 2:1.

The following non-limiting examples are illustrative of the scope of this invention.

EXAMPLE I

A series of experiments were carried out in which the reaction of nitrosyl chloride and hydrogen cyanide was investigated at elevated temperatures in the absence of a catalyst. Helium at about 200 cc./min. was bubbled through liquid hydrogen cyanide at 0° C., and the resulting gas mixture was blended with nitrosyl chloride at about 30 cc./min. The gas stream was then charged to an empty, electrically heated tube of high-silica glass. Runs of about 30-minutes duration were carried out at about 350°, 450°, and 550° C. In the first run there was no visual evidence of a reaction, and no liquid products were formed. In the second run, the only evidence of reaction was the observation that the brown NOCl color was almost imperceptible in the product gases. In the third run, there was no brown NOCl color in the product gases and a very faint white film formed in the apparatus on the exit side of the heated zone. Samples of the charged gas (prior to admixture with nitrosyl chloride) and the product gas were submitted for mass spectrometric analysis. Calculations of the results of these runs were based upon these mass spectrometer data. Nitrosyl chloride cannot be determined by the mass spectrometer so the charge in each run was measured by a calibrated flowmeter. The amounts of nitrosyl chloride consumed in these runs could not be measured. The conditions and results of these three runs are shown in Table I.

Table I

| Run number | 1 | 2 | 3 |
|---|---|---|---|
| Temperature range (° C.) | 350-353 | 448-455 | 544-546 |
| Duration of run (minutes) | 30 | 35 | 30 |
| Gaseous hourly space velocity of total charge gas | 217 | 218 | 218 |
| Mole ratio (HCN/NOCl) | 3.1 | 3.2 | 3.2 |
| Percent conversion of HCN | 2.5 | 9.9 | 20.8 |
| CNCl yield per pass: | | | |
| Based on HCN | 5.3 | 23.0 | 27.5 |
| Based on NOCl | 17.0 | 73.7 | 88.3 |

Assuming that 1 mol of hydrogen cyanide is used in the formation of 1 mol of cyanogen chloride, the selectivity for formation of cyanogen chloride is substantially quantitative. The reaction proceeded smoothly without difficulty, but the analytical results indicated a higher formation of cyanogen chloride than the conversion of hydrogen cyanide indicated. It is probable that the conversion values should be somewhat higher, and that the cyanogen chloride selectivity values are substantially 100%. Similar runs were carried out at about 210° and 310° C., and little or no reaction occurred. No cyanogen chloride or cyanogen was produced in the lower-temperature runs, and no cyanogen was produced in the runs carried out at 350°, 450°, or 550° C.

EXAMPLE II

Another series of experiments was carried out in which hydrogen cyanide was reacted with nitrosyl chloride at various elevated temperatures in the presence of an oxidation catalyst. These experiments were carried out using an electrically heated, heat-resistant, glass reactor tube containing 25 cc. of catalyst made by incorporating 10% $MgCl_2$ solution on pumice. Helium at 200 cc./min. was bubbled through liquid hydrogen cyanide at about 0° C. and the resulting gas mixture was blended with nitrosyl chloride flowing at about 30 cc./min. The gas stream was then charged to the reactor tube containing the oxidation catalyst. Runs of about 30-minutes duration were carried out at temperatures ranging from about 200° C. to 550° C. No liquid products were formed in any of the runs. At the higher temperatures, a small amount of a white solid film appeared in the apparatus on the exit side of the heated zone. The amount was so small that this solid was ignored in evaluating the results of the experiments.

Gas samples of the charge gas (prior to admixture with nitrosyl chloride) and the product gas from each run were submitted for mass spectrometric analysis. The calculations of the results are based on these data. As indicated in Example I, nitrosyl chloride cannot be determined by the mass spectrometer, so the amount charged in each run was measured by a calibrated flowmeter. The amount of nitrosyl chloride consumed in these runs could not be measured. In Table II, the experimental conditions and results of the several runs are set forth.

Table II

| Run Number | 4 | 5 | 6 | 7 | 8 | 9 |
|---|---|---|---|---|---|---|
| Temp. range (° C.) | 200-210 | 297-320 | 348-355 | 397-401 | 452-456 | 546-560 |
| Duration (min.) | 30 | 30 | 30 | 30 | 30 | 30 |
| Gaseous hourly space velocity of total charge gas | 835 | 827 | 803 | 838 | 813 | 803 |
| Mol ratio HCN/NOCl | 3.6 | 3.6 | 3.2 | 3.7 | 3.4 | 3.2 |
| Percent HCN conversion | 0.0 | 20.2 | 20.2 | 23.2 | 27.0 | 38.6 |
| Molar yields per pass:* | | | | | | |
| $(CN)_2$—Based on HCN | 0.0 | 1.6 | 4.8 | 6.1 | 16.3 | 38.8 |
| $(CN)_2$—Based on NOCl | 0.0 | 3.0 | 7.7 | 11.1 | 27.3 | 62.5 |
| CNCl—Based on HCN | 0.6 | 9.6 | 22.1 | 11.8 | 13.0 | 0.0 |
| CNCl—Based on NOCl | 2.2 | 34.0 | 71.1 | 43.2 | 43.8 | 0.0 |
| Molar Selectivities:* | | | | | | |
| $(CN)_2$—Based on HCN | 0 | 8.0 | 23.6 | 26.0 | 60.3 | 100.5 |
| CNCl—Based on HCN | | 47.6 | 109.1 | 50.6 | 48.2 | 0.0 |

*Yields are defined as mols of product expressed as a percentage of mols of reactant charged. Selectivities are calculated on the assumption that 2 mols HNC produce 1 mol of $(CN)_2$ and that 1 mol HCN produces 1 mol CNCl.

NOTE.—When the data in these runs are compared with those in Example I, it is seen that the use of an oxidation catalyst results in a substantial increase in HCN conversions. In the presence of the catalyst, the yields of CNCl are substantially increased at temperatures up to about 350° C. At temperatures above about 450° C., cyanogen is the major product, and at temperatures above about 500° C., cyanogen chloride is not produced to any appreciable extent and the selectivity for production of cyanogen is substantially 100%.

EXAMPLE III

When the process described in Example II is repeated, substituting different catalysts which are known to be effective in accelerating the oxidation of hydrogen cyanide by nitrogen dioxide to produce cyanogen, results are obtained which are substantially identical to those in the previous example. Thus, when lime-glass beads, calcium oxide, magnesium oxide (supported on pumice), or metallic silver supported on corundum are substituted in the reactor tube, and the mixture of hydrogen cyanide and nitrosyl chloride (with or without helium diluent) is passed through the reactor at an elevated temperature (in the range from about 200° to 1000° C.), cyanogen and/or cyanogen chloride are obtained in varying degrees depending upon the reaction temperature used. The conversion of hydrogen cyanide using these catalysts is substantially higher than in the absence of catalysts, and at temperatures up to about 350° C. the yields of cyanogen chloride are substantially improved. At higher temperatures, the yields of cyanogen become predominant, and at temperatures above about 500° C., cyanogen is the only product containing the cyanide group.

From the foregoing examples, we have found that hydrogen cyanide can be reacted with nitrosyl chloride in the presence of an oxidation catalyst to yield substantial amounts of cyanogen and/or cyanogen chloride. In carrying out the reaction, the catalysts which can be used include generally the oxides or strong acid salts of metals of Groups I and IIA of the Periodic Table, either alone or on a suitable carrier material. In general, catalysts described in Patent 2,884,308, and in the co-pending patent applications mentioned above, can be used in effecting a higher conversion of hydrogen cyanide in the reaction with nitrosyl chloride, and in producing better yields of cyanogen chloride at temperatures up to about 350° C., and of cyanogen at temperatures above about 500° C. In carrying out our process, the reactor design and materials of construction for the reactor are not critical. In general, a suitable continuous flow reactor is preferred which should be made of any suitable material of construction which is inert toward the reactants and the products at temperatures from room temperature or below up to and above the reaction temperature used in the process. The pressure of reaction is not critical and may vary from sub-atmospheric to super-atmospheric pressures, although atmospheric pressure or a very slight super-atmospheric pressure is preferred. The proportion of reactants is not critical and may vary widely as previously indicated, although HCN/NOCl mol ratios greater than about 2:1 are preferred. While the reaction temperature used may be any suitable temperature in the range from about 200° to 1000° C., the reaction temperature is selected in accordance with the maximum economical yield of the desired product. Where cyanogen alone is desired as the product, the reaction should be carried out at temperatures above about 500° C. Where cyanogen chloride is the desired product, a reaction temperature of about 300°–400° C. is desirable. Where mixtures of reaction products are desired, any suitable temperature can be used within the operative temperature range. The process may be conducted in continuous, semi-continuous, or batch procedure. In the case of continuous operation, the reaction products and by-products are separated and unreacted hydrogen cyanide is recycled together with fresh nitrosyl chloride. The nitric oxide by-product which is recovered from the reaction effluent can be reconverted by reaction with chlorine to nitrosyl chloride for further reaction.

While we have described our invention fully and completely with special emphasis upon several preferred embodiments thereof, we wish it to be understood that within the scope of the appended claims this invention may be practiced otherwise than as specifically described herein.

The embodiments of the invention in which an exclusive property or privilege is claimed are defined as follows:

1. A method of preparing cyanogen which consists of reacting HCN with NOCl at a temperature of 300°–1000° C. in the presence of an oxidation catalyst containing at least one compound selected from the group consisting of oxides and salts of strong acids of metals of Groups I and IIA of the Periodic Table.

2. A method in accordance with claim 1 in which the catalyst is $MgCl_2$.

3. A method in accordance with claim 1 in which the catalyst is MgO.

4. A method in accordance with claim 1 in which the HCN/NOCl mol ratio is greater than 2:1.

5. A method in accordance with claim 1 in which the reaction temperature is in the range from about 300° to 500° C. and the reaction effluent contains $(CN)_2$ and CNCl.

6. A method in accordance with claim 1 in which the reaction temperature is above about 500° C. and the selectivity for formation of $(CN)_2$ is substantially 100%.

7. A method in accordance with claim 6 in which the reaction temperature is 546–560° C.

8. A method in accordance with claim 5 in which the reaction temperature is 348–355° C.

References Cited by the Examiner

UNITED STATES PATENTS

| | | | |
|---|---|---|---|
| 2,152,357 | 3/39 | Moyer | 23—157 |
| 2,399,361 | 4/46 | Lacy et al. | 23—151 |
| 2,884,308 | 4/59 | Fierce et al. | 23—151 |

MAURICE A. BRINDISI, *Primary Examiner.*